March 4, 1952 — G. I. GOODWIN — 2,587,837
CLUTCH PLATE
Filed May 10, 1947 — 3 Sheets-Sheet 1
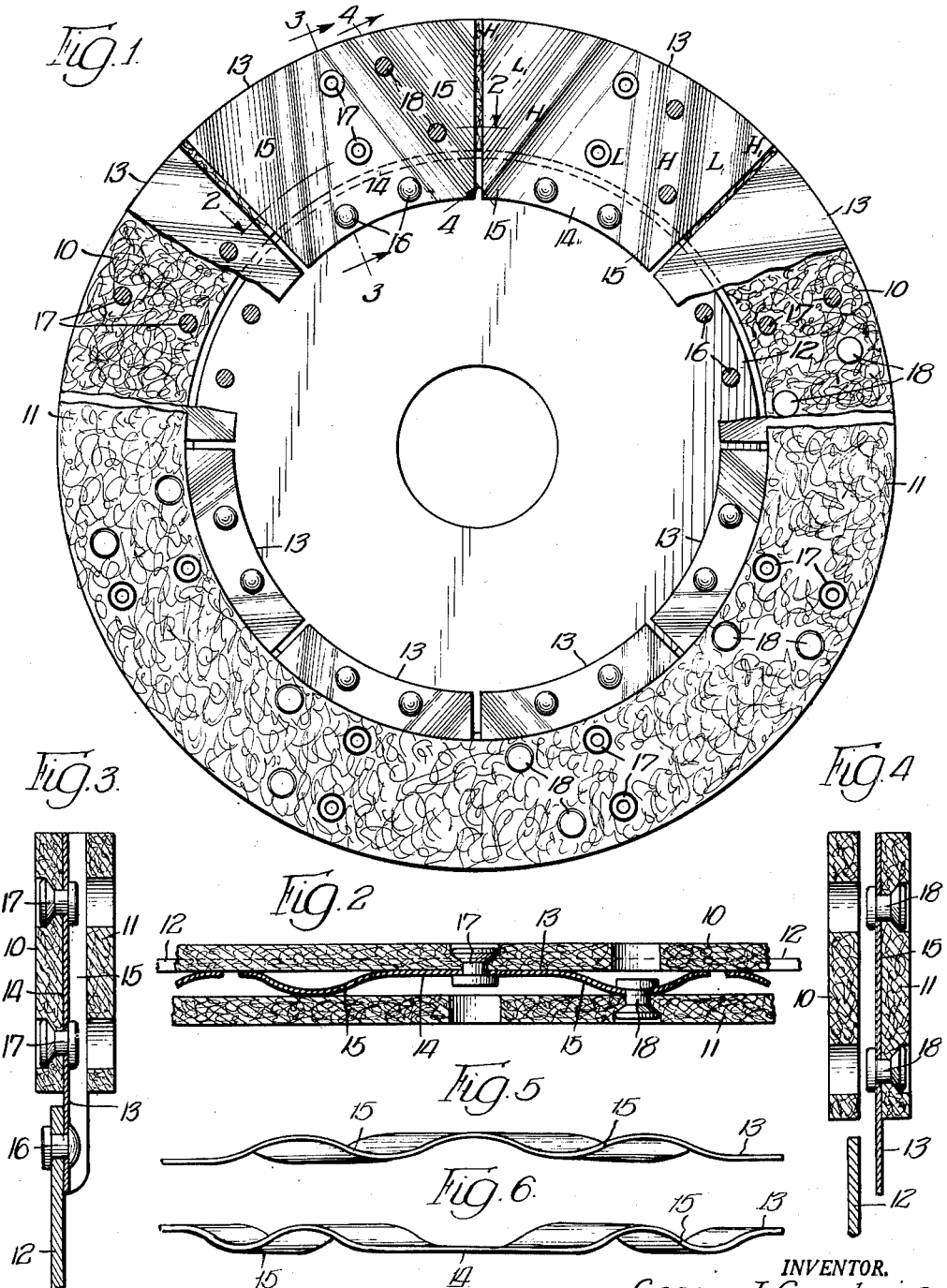
INVENTOR.
George I. Goodwin,
BY
Cromwell, Greist-Warden
ATTYS.

March 4, 1952 — G. I. GOODWIN — 2,587,837
CLUTCH PLATE
Filed May 10, 1947 — 3 Sheets-Sheet 2
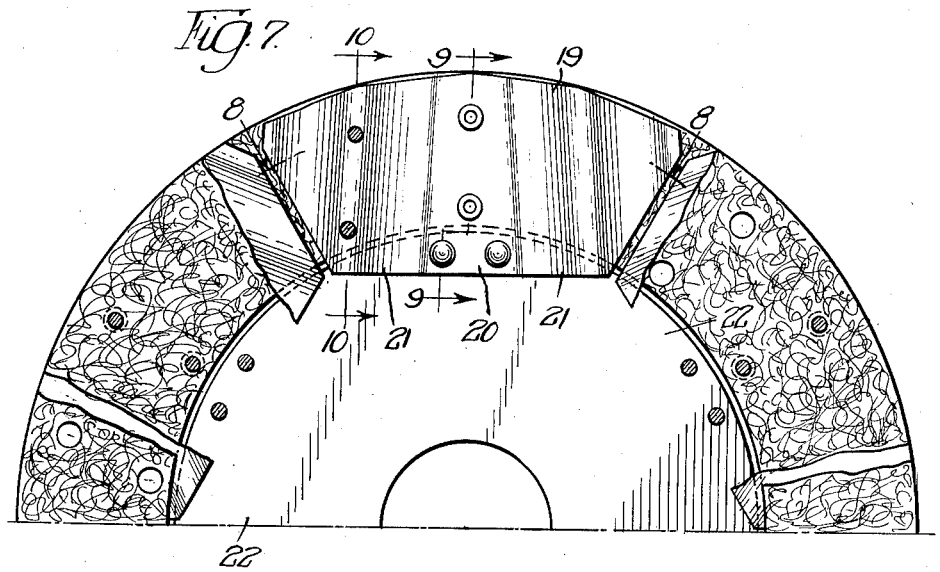
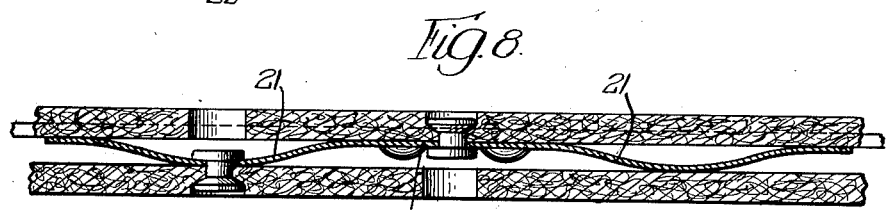
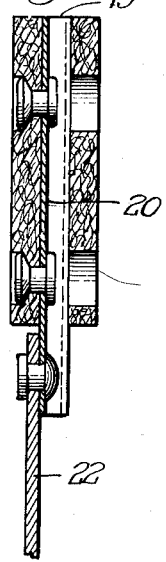
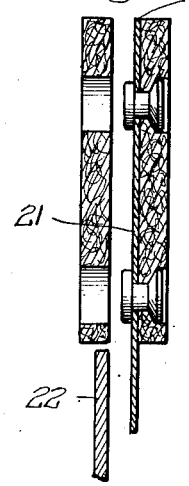
INVENTOR.
George I. Goodwin,
BY Cromwell, Greist & Warden
Attys March 4, 1952  G. I. GOODWIN  2,587,837
CLUTCH PLATE
Filed May 10, 1947  3 Sheets-Sheet 3
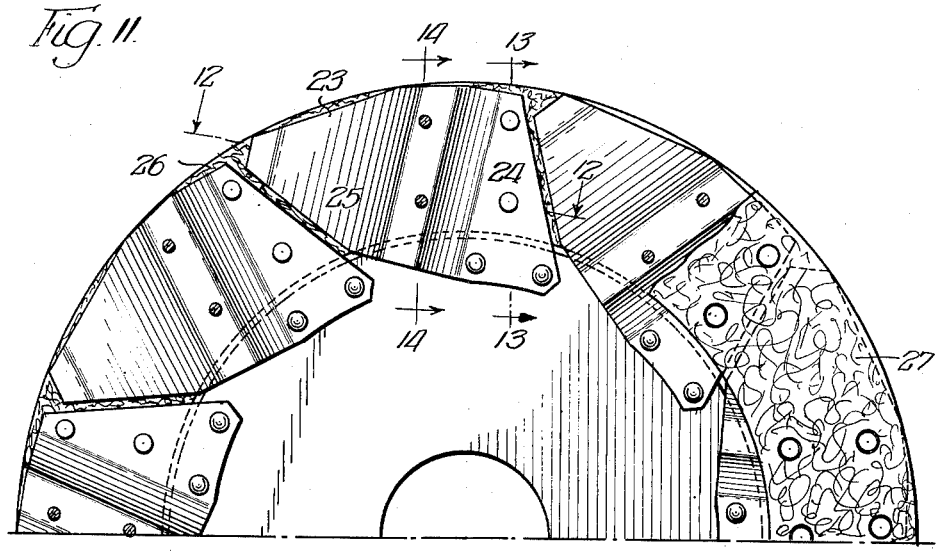
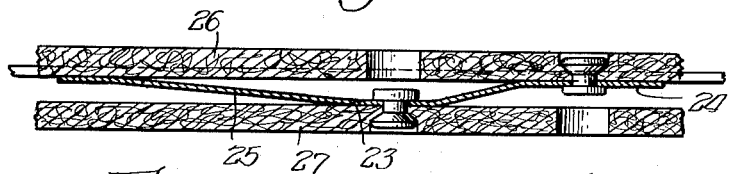
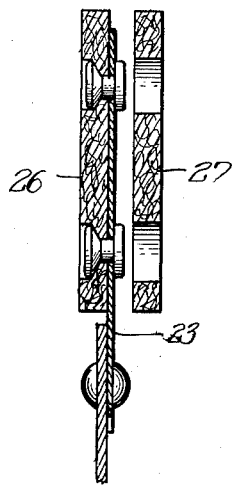 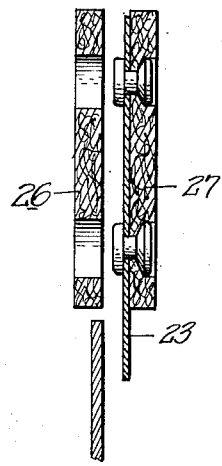
INVENTOR.
George L. Goodwin,
BY
Cromwell, Greist & Warden
Attys.

Patented Mar. 4, 1952

2,587,837

UNITED STATES PATENT OFFICE 2,587,837

CLUTCH PLATE

George I. Goodwin, Birmingham, Mich.

Application May 10, 1947, Serial No. 747,283

5 Claims. (Cl. 192—107)

This invention relates to clutch driven plates for use in clutches of automotive vehicles, and is particularly concerned with plates of the so-called low spinning inertia type in which a pair of annular friction facings are supported beyond the outer edge of a small diameter mounting disk by a plurality of relatively thin spring steel cushion members.

The object of the present invention is to provide an improved plate of the character described in which the cushion members are so shaped and connected with the mounting disk as to eliminate the necessity of any necking down and consequent weakening of the cushion members adjacent their points of attachment to the disk, or any cutting away or deformation of the disk intermediate such points, while allowing free action of the cushion members under compression.

While the foregoing statement is indicative in a general way of the nature of the invention, other more specific objects and advantages will be apparent to those skilled in the art upon a full understanding of the construction and arrangement of the cushion members and mounting disk.

Three embodiments of the invention are presented herein by way of exemplification but it will of course be appreciated that the invention is susceptible of incorporation in other modified forms coming equally within the scope of the appended claims.

In the drawings,

Fig. 1 is a face view of a clutch plate constructed in accordance with the invention, with the hub removed and certain other portions broken away;

Figs. 2, 3 and 4 are sections taken respectively on the lines 2—2, 3—3 and 4—4 of Fig. 1;

Fig. 5 is an outer edge view of one of the spring steel cushion members;

Fig. 6 is an inner edge view of one of the cushion members;

Fig. 7 is a face view of one-half of a clutch plate which embodies a modified form of the invention;

Figs. 8, 9 and 10 are sections taken respectively on the lines 8—8, 9—9 and 10—10 of Fig. 7;

Fig. 11 is a face view of one-half of a clutch plate which embodies another modified form of the invention; and Figs. 12, 13 and 14 are sections taken respectively on the lines 12—12, 13—13 and 14—14 of Fig. 11.

The clutch plate structure shown in Figs. 1 to 6, inclusive, includes a pair of axially separated annular friction facings 10 and 11, a sheet metal mounting disk 12 of smaller diameter than the inner edges of the facings, and a plurality of relatively thin spring steel cushion members 13, which cushion members are arranged in annular array about the disk 12 between the facings 10 and 11. Inwardly of the cushion members 13 the disk 12 is connected with a centrally located hub (not shown).

The marginal portion of the disk 12 in the vicinity of the cushion members 13 is flat and substantially circular in shape, as distinguished from being axially offset or cut away at intervals as in certain prior art constructions, which marginal formation permits of very inexpensive manufacture. For simplicity of illustration the disk 12 is shown as a plain centrally apertured member, but in a clutch plate of the so-called "spring center" type (which is the type commonly employed in passenger cars, commercial cars, trucks, etc.) the disk will not be connected directly with the hub but will form the outer ring-like part of a multiple-part spring center construction which will permit the disk to yield resiliently in a circumferential direction through a small angle relative to the hub, all as is well known in the art.

The cushion members 13 provide a substantially continuous cushion formation between the facings 10 and 11 and are preferably arranged with their side edges in but slightly spaced relation to each other. They are of generally rectangular formation, as distinguished from being abruptly necked down adjacent their points of attachment to the disk, and are quite thin, being preferably somewhere between .015" and .025" in thickness.

Each of the cushion members 13 is characterized by a flat portion 14 and by two waved portions 15, which waved portions are disposed at opposite sides of the flat portion 14 and are substantially coextensive therewith. The flat portion 14 and the waved portions 15 are all arranged with their inner edges in radially overlapped relation to the disk 12, with the flat portion 14 rigidly secured to the disk by rivets 16, and with the waved portions 15 bowed away from the disk. The flat portion 14 and the waved portions 15 all continue outwardly from their overlapped relation with the disk 12 into positions between the facings 10 and 11, with the flat portion 14 rigidly secured to the facing 10 by rivets 17, and with one only of the waved portions 15 rigidly secured to the facing 11 by rivets 18.

It will be observed in this first described embodiment of the invention that the flat portion 14 of each of the cushion members 13 is of generally triangular outwardly converging form and that the waved portions 15 are deformed on straight parallel bend lines which extend outwardly from the inner and side edges to the outer edges of the cushion members and are disposed at an acute angle to the radius of the disk, with the bend lines of the two waved portions converging outwardly. Starting from the plane of the flat portion 14, which portion is contiguous with the underlying portion of the disk 12 and is marked "L" to indicate low, the waved portions 15 are first bowed away from that plane and away from the disk to a high bend line marked "H," then back to a low bend line marked "L₁" and then back again to a high bend line marked "H₁."

While the waved portions 15 are shown as having one and one-half waves, it will be appreciated that more or less waving may be employed as desired. The low bend line "L₁" may be disposed in the same low plan "L" as the flat portion 14, as shown, or it may be disposed in a still lower plane, beyond the attaching plane of the disk 12, since the inner end of the bend line "L₁" terminates well outwardly of the circular edge of the disk. Or, it may even be disposed in a higher plane, above the attaching plane of the disk.

In the operation of this clutch plate the waved portions 15 are adapted to collapse into a substantially flattened condition upon engagement of the associated clutch. When the clutch is disengaged the wave portions 15 will again resume their axially deformed or waved shapes, forcing the facings 10 and 11 apart. The inner parts of the waved portions 15 which overlie the disk 12 flex freely with and to the same degree as the outer parts of those portions, without interference in any way from the underlying margin of the disk, and serve to materially strengthen the cushion members in the vicinity of their points of attachment to the disk.

In the embodiment of the invention shown in Figs. 7 to 10, inclusive, each of the cushion members 19 is again characterized by a flat attaching portion 20 and by two waved portions 21, but the waved portions 21 in this instance are formed on straight parallel bend lines which are generally parallel to the radius of the disk 22, as distinguished from being disposed at acute angles relative to the same.

In the embodiment shown in Figs. 11 to 14, inclusive, each of the cushion members 23 is characterized by a generally triangular flat portion 24 and by a single waved portion 25. As in the previously described embodiments, the flat portion 24 is attached inwardly to the disk and outwardly to the facing 26, while the waved portion 25, which initially overlaps the disk, is secured to the other facing 27. In this embodiment the side edges of the cushion members 23 are disposed at an angle to the radii of the disk, which permits of a circumferential overlapping of the waved portion 25 of each cushion member with the flat portion 24 of the next, thus effecting a uniform distribution of the cushioning points throughout the circumference of the clutch plate.

I claim:

1. In a clutch driven plate, a pair of annular friction facings, a mounting disk of smaller diameter than the inner edges of the facings, which disk is characterized by a flat generally circular cushion attaching margin, and a plurality of relatively thin spring steel cushion members arranged in annular array about the disk between the facings, said cushion members having laterally juxtaposed flat and waved portions and being of substantially continuous, uninterrupted surface area over said portions, being marginally defined by substantially continuous and generally unidirectional edges, both portions of each cushion member being arranged to engage said disk in radially overlapped relation to the margin of the disk, with the flat portion rigidly secured thereto and the waved portion bowed therefrom, and both portions extending outwardly from the disk into positions between the facings, with the flat portion rigidly attached to one facing and the waved portion rigidly attached to the other facing.

2. In a clutch driven plate, a pair of annular friction facings, a mounting disk of smaller diameter than the inner edges of the facings, which disk is characterized by a flat generally circular cushion attaching margin, and a plurality of relatively thin spring steel cushion members arranged in annular array about the disk between the facings, said cushion members being of generally rectangular form and having laterally juxtaposed, generally triangular, flat and waved portions, said cushions being of substantially continuous, uninterrupted surface area over said portions, being marginally defined by substantially continuous and generally unidirectional edges, both portions of each cushion member being arranged in radially overlapped relation to the margin of the disk, with the flat portion rigidly secured thereto and the waved portion bowed therefrom, and both portions extending outwardly from the disk into positions between the facings, with the flat portion rigidly attached to one facing and the waved portion rigidly attached to the other facing.

3. In a clutch driven plate, a pair of annular friction facings, a mounting disk of smaller diameter than the inner edges of the facings, which disk is characterized by a flat generally circular cushion attaching margin, and a plurality of relatively thin spring steel cushion members arranged in annular array about the disk between the facings, said cushion members having laterally juxtaposed portions of generally flat and generally triangular shape and portions which are offset from said first named portions on bend lines disposed at acute angles to radii of the disk, said cushions being of substantially continuous, uninterrupted surface area over said portions, being marginally defined by substantially continuous and generally unidirectional edges, both portions of each cushion member being arranged in radially overlapped relation to the margin of the disk, with said first named portion rigidly secured thereto and the other portion initially offset therefrom, and both portions extending outwardly from the disk into positions between the facings, with said first named portion rigidly attached to one facing and the other portion rigidly attached to the other facing.

4. In a clutch driven plate, a pair of annular friction facings, a mounting disk of smaller diameter than the inner edges of the facings, which disk is characterized by a flat generally circular cushion attaching margin, and a plurality of relatively thin spring steel cushion members arranged in annular array about the disk between the facings, said cushion members being of generally rectangular form and having laterally juxtaposed flat and waved portions, the waved portions being formed on outwardly extending bend lines disposed at acute angles to radii of the plate, said cushions being of substantially continuous, uninterrupted surface area over said portions, being marginally defined by substantially continuous and generally unidirectional edges, both portions of each cushion member being arranged in radially overlapped relation to the margin of the disk, with the flat portion rigidly secured thereto and the waved portion initially bowed therefrom, and both portions extending outwardly from the disk into positions between the facings, with the flat portion rigidly attached to one facing and the waved portion rigidly attached to the other facing, the inner end of the first complete bend in the waved portion to one side of the flat portion terminating outwardly of the edge of the peripheral disk.

5. In a clutch plate, a pair of annular friction facings, a mounting disk of smaller diameter than the inner edges of the facings, which disk is characterized by a flat, generally circular, cushion attaching margin, and a plurality of relatively thin spring steel cushion members arranged in annular array about the disk between the facings, said cushion members being shaped and positioned relative to said disk to present side edges which extend at an angle to radii of the disk and being disposed in circumferential overlapping relationship of successive cushion members, said cushion members having laterally juxtaposed portions of generally flat and generally triangular shape and portions which are offset from said first named portions on bend lines disposed at acute angles to radii of the disk, said cushions being of substantially continuous, uninterrupted surface area over said portions, being marginally defined by substantially continuous and generally unidirectional edges, both portions of each cushion member being arranged in radially overlapped relation to the margin of the disk, with said first named portion rigidly secured thereto and the other portion axially offset therefrom, and both portions extending outwardly from the disk into positions between the facings, with said first named portion rigidly attached to one facing and the other portion rigidly attached to the other facing.

GEORGE I. GOODWIN.

REFERENCES CITED

The following references are of record in the file of this patent:

UNITED STATES PATENTS

| Number | Name | Date |
| --- | --- | --- |
| 2,221,823 | Thelander | Nov. 19, 1940 |
| 2,256,712 | Hunt | Sept. 23, 1941 |
| 2,337,097 | Geyer | Dec. 21, 1943 |
| 2,380,835 | Goodwin | July 31, 1945 |